US011974103B2

(12) United States Patent
Winton et al.

(10) Patent No.: US 11,974,103 B2
(45) Date of Patent: Apr. 30, 2024

(54) IN-CAR HEADPHONE ACOUSTICAL AUGMENTED REALITY SYSTEM

(71) Applicant: HARMAN INTERNATIONAL INDUSTRIES, INCORPORATED, Stamford, CT (US)

(72) Inventors: Riley Winton, Opelika, AL (US); Christopher Ludwig, Bloomfield Hills, MI (US); Jason Choi, Ferndale, MI (US); Philippe Dreiling, Stamford, CT (US)

(73) Assignee: Harman International Industries, Incorporated, Stamford, CT (US)

( * ) Notice: Subject to any disclaimer, the term of this patent is extended or adjusted under 35 U.S.C. 154(b) by 442 days.

(21) Appl. No.: 17/420,321

(22) PCT Filed: Jan. 2, 2020

(86) PCT No.: PCT/US2020/012043
§ 371 (c)(1),
(2) Date: Jul. 1, 2021

(87) PCT Pub. No.: WO2020/142600
PCT Pub. Date: Jul. 9, 2020

(65) Prior Publication Data

US 2022/0095045 A1 Mar. 24, 2022

Related U.S. Application Data

(60) Provisional application No. 62/787,978, filed on Jan. 3, 2019.

(51) Int. Cl.
*H04R 3/00* (2006.01)

(52) U.S. Cl.
CPC ......... *H04R 3/005* (2013.01); *H04R 2499/13* (2013.01)

(58) Field of Classification Search
CPC ............................ H04R 3/005; H04R 2499/13
USPC ............................................................ 381/86
See application file for complete search history.

(56) References Cited

FOREIGN PATENT DOCUMENTS

| | | | |
|---|---|---|---|
| EP | 1860918 | A1 | 11/2007 |
| EP | 2876639 | A2 | 5/2015 |
| JP | 2004191871 | A | 7/2004 |
| JP | 2005159914 | A | 6/2005 |
| JP | 2005161873 | A | 6/2005 |
| JP | 2014030254 | A | 2/2014 |

*Primary Examiner* — Sean H Nguyen
(74) *Attorney, Agent, or Firm* — Brooks Kushman, P.C.

(57) ABSTRACT

An in-car headphone system may include a first headset associated with a vehicle occupant and configured to transmit audio signals to an associated occupant; at least one interior microphone configured to receive an interior audio signal from within a vehicle cabin; at least one exterior microphone configured to receive an exterior audio signal acquired from outside of the vehicle; and a processor configured to receive at least one of the interior audio signal from the at least one interior microphone and the exterior audio signal from the at least one exterior microphone; determine whether at least one of the interior audio signal and exterior audio signal include a trigger command or an alert signal; and transmit the audio signal that includes the trigger command or alert signal to the first headset in response to the audio signals including a trigger command or an alert signal.

19 Claims, 3 Drawing Sheets

IN-CAR HEADPHONE ACOUSTICAL AUGMENTED REALITY SYSTEM

CROSS-REFERENCE TO RELATED APPLICATIONS

This application is the U.S. national phase of PCT Application No. PCT/US2020/012043 filed on Jan. 2, 2020, which claims the benefit of U.S. provisional application Serial No. 62/787,978 filed Jan. 3, 2019 the disclosures of which are hereby incorporated in their entirety by reference herein.

TECHNICAL FIELD

Disclosed herein are in-car headphone acoustical augmented reality systems.

BACKGROUND

Vehicles are often equipped with various infotainment systems including vehicle radio, screens for viewing movies, headphones, spatial audio systems, etc. Often vehicles carry multiple occupants, each wishing to use a different infotainment system. However, existing loudspeaker technology within the vehicle may prevent the separation of content between the various occupants.

SUMMARY

An in-car headphone system may include a first headset associated with a vehicle occupant and configured to transmit audio signals to an associated occupant; at least one interior microphone configured to receive an interior audio signal from within a vehicle cabin; at least one exterior microphone configured to receive an exterior audio signal acquired from outside of the vehicle; and a processor programmed to receive at least one of the interior audio signal from the at least one interior microphone and the exterior audio signal from the at least one exterior microphone; determine whether at least one of the interior audio signal and exterior audio signal include a trigger command or an alert signal; and transmit the audio signal that includes the trigger command or alert signal to the first headset in response to the audio signals including a trigger command or an alert An in-car headphone system may include a first headset associated with a first vehicle occupant and configured to transmit audio signals to the first vehicle occupant; at least one exterior microphone configured to receive an exterior audio signal acquired from outside of the vehicle; and a processor programmed to receive the exterior audio signal from the at least one exterior microphone, determine whether the exterior audio signal include an alert signal, and transmit the exterior audio signal the first headset in response to the exterior audio signal including the alert An in-ear headphone method may include receiving an interior audio signal from at least one interior microphone; receiving at least one trigger command including an identification of which of a subset of a plurality of headsets to transmit the interior audio signal to, each of the headsets associated with a vehicle occupant; and transmitting the interior audio signal to the subset of headsets in response to the trigger command.

BRIEF DESCRIPTI N OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

Figure 1:
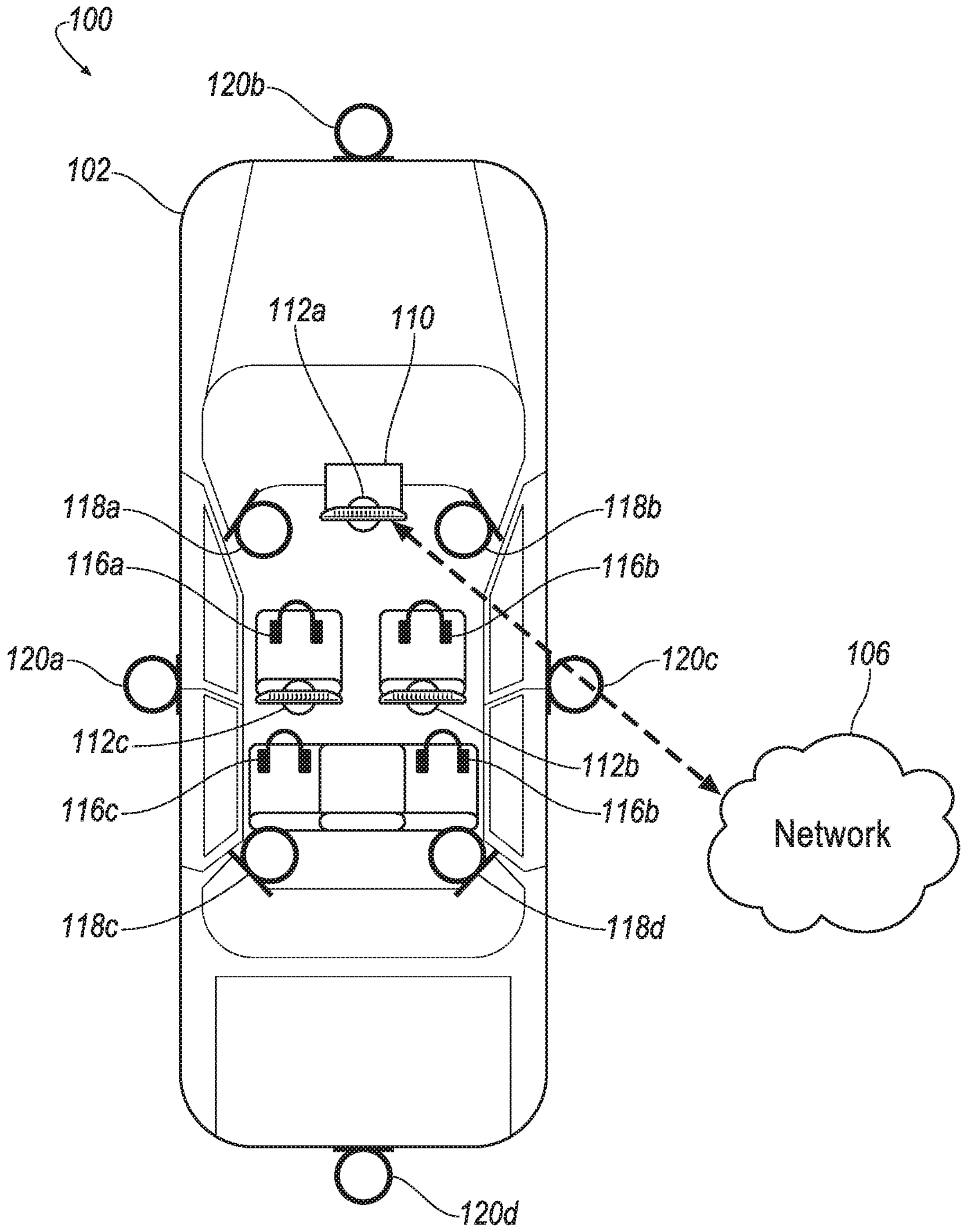
FIG. 1 illustrates an example video audio system for a vehicle.

As required, detailed embodiments of the present invention are disclosed herein; however, it is to he understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is an audio system for a vehicle that includes a network of internally facing car cabin microphones and externally facing car environment microphones to provide an acoustical augmented reality system for enhanced communication and increased awareness for environmental factors. The system may include a number or array of microphones inside the vehicle to capture speech. Approximately one microphone or microphone array per occupant seat may be included. The external microphones may capture a significant acoustic signature from the external environment. Each occupant may have a pair of personal headphones. The vehicles human machine interface (HMO) or audio processing unit may control the user inputs and preferences and map the microphone signals to the various headphone outputs.

The system may also include an adaptive system for detecting emergency sound signatures (e.g., ambulance sirens) to aid the driver in awareness and cognitive driving tasks. The system may increase driver awareness of external events such as playing back real-time environmental sound for accident avoidance and increased awareness. The system may also allow for private conversations between two occupants, personalized media for each occupant, and parent monitoring of conversations for each occupant. The system may layer these features and provide for a flexible and robust system that handles many types of user interactions.

Typical vehicle audio systems may rely on standard loudspeaker technology to distribute acoustic energy through the entire cabin. This may prevent the separation of content between different occupants. Headphones may help solve this issue, but may also prevent external sounds from being recognized. Further, headphones may prevent natural speech among the occupants.

With these systems, users may have external and environmental sounds played back in real-time or near real-time through the headphones, thus enabling emergency or environmental sounds and sirens to be audible. Additionally, internal sounds like speech and conversation may be controlled and played back on demand. More specifically, the user may opt-in or opt-out of conversation with any occupant. For example, if a driver wishes to have a private conversation with the front seat passenger, he or she may exclude the rear row occupants via HMI control. Further, using headphones allows the audio experience for each user to be personalized for preferences, equalization, loudness, content, and even comfort.

Figure 2:
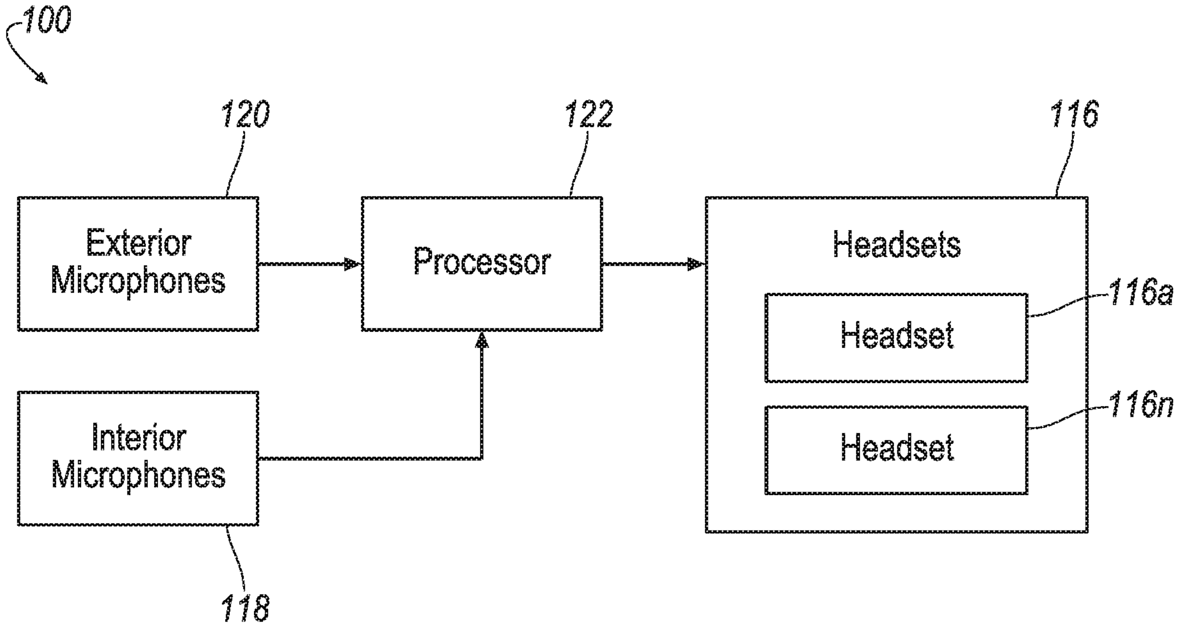
FIG. 2 illustrates an example block diagram of the audio system of FIG. 1.

FIG. 1 illustrates an example vehicle audio system 100 for a vehicle 102. The system 100 may include the vehicle 102 and a remote network 106. The vehicle 102 may include a processor 110 arranged within a vehicle. The processor 110 may be included in the vehicle head unit, or a vehicle ECU. The processor 110 may include various vehicle systems such as navigation, infotainment, autonomous vehicle systems, etc. The processor 110 may include an audio system processor 122 (as shown in FIG. 2) configured to determine when and where to audibly play certain audio signals within the vehicle 102. The vehicle processor 110 and/or the audio system processor 122 may each include a controller (not shown) configured to control various vehicle systems and devices.

The vehicle 102 may include a plurality of internal infotainment devices 112. The infotainment devices 112 may be devices configured to present content to a user, either audibly, visually, haptically, etc., within the vehicle cabin. For example, the infotainment devices 112 may include a vehicle speaker configured to present audible sounds within the vehicle 102. The infotainment devices 112 may include a display or projector configured to visually present information. One or more of these devices may make up the infotainment device 112. For example, the infotainment device 112 may include devices that provide both audio and video information (e.g., both a speaker and a display).

The infotainment devices 112 may present content, such as media content including music, video, etc., to the vehicle occupants. The content may include various forms of infotainment, alerts, etc. In one example, the infotainment devices 112 may present and playback audio content as requested by the user at such as a specific radio station, artist, song, content, etc. In another example, the information may present requested navigation commands as defined by a driving route to a desired destination.

The infotainment devices 112 may be arranged at various locations throughout the vehicle 102. In the example shown in FIG. 1, a first infotainment device 112*a* is arranged at the vehicle head unit. A second infotainment device 112*b* and a third infotainment device 112*c* are arranged on the back headrest and configured to be visible by the rear occupants. These locations are merely exemplary. Furthermore, the infotainment devices 112 may be portable personal devices of each occupant such as the occupants' phone or table. More of less infotainment device 112 may be included in the vehicle 102.

Each occupant may be associated with a headset 116. The headset 116 may include at least one headphone set configured to be worn by each occupant to allow each occupant to enjoy media content without disturbing the other occupants. The headset 116 may also be configured to selectively emit sounds, such as voices, of other occupants. The headset 116 may be wireless headset connected via wireless communication with a user device. The headset 116 may also be connected with the infotainment device 112 or other user device via a wired connection. The headset 116 may include a microphone configured to acquire noise, such as voices. The processor 110 may control output to each headset 116, including various signal processing, inputs, preferences, etc., to enhance the quality of the audio output. FIG. 1 illustrates a headset associated with each seat position including headsets 116*a*, 116*b*, 116*c*, 116*d* (collective referred to as headsets 116).

The vehicle 102 may also include a plurality of interior microphones 118*a*, 118*b*, 118*c*, 118*d* (collectively referred to as interior microphones 118. The interior microphones 118 may be facing he interior of the vehicle 102 and may be configured to acquire ambient noise, voice sounds, and other acoustic events. The interior audio signals acquired by the interior microphones 118 may be transmitted to headsets 116 of the occupants. Approximately one interior microphone 118 may be included for each occupant seat to acquire audio signals from each occupant. The interior microphone 118 may include a microphone array, and more or less microphones may be included. In the example of FIG. 1, a one to one ratio of interior microphones 118 and headsets 116 are illustrated, however, a higher or lower ratio may be appreciated. Further, the microphones 118 may include microphone arrays. Often, such microphones are arranged in the headliner or seatback.

The vehicle 102 may also include a plurality of exterior microphones 120*a*, 120*b*, 120*c*, 120*d* (collectively referred to as exterior microphones 120) facing exterior of the vehicle 102 and configured to acquire sounds exterior of the vehicle such as emergency vehicle sirens, traffic instructions, and other acoustic events. The exterior microphones 120 may be arranged at various locations around the vehicle 102. In the example shown in FIG. 1, left exterior microphone 120*a*, front exterior microphone 120*b*, right exterior microphone 120*c*, and rear external microphone 120*d*, may be included. More or less microphones may be included and the position of each in FIG. 1 is an example configuration.

The processor 122 may receive the exterior audio signal from at least one the exterior microphone and determine whether these sounds should be passed through to one or more of the vehicle occupants. For example, if an occupant is listening to music via a headset, specifically the driver, then the processor 122 may determine that a siren from an emergency vehicle should be passed through to the driver and emit the sound via the driver's headset 116*a*.

Although not shown, the vehicle 102 may include a connected vehicle system including one or more systems facilitated via connected car or connected vehicle telematics. These systems may include features available on a separate mobile device, usually a mobile device of the driver. The processor 110 of the vehicle 102 may communicate wirelessly with the mobile device (not shown) to access data within the mobile device such as the driver's calendar, navigation system, GPS antenna, etc. The data may include data specific and local to the mobile device of the driver such as music, photos, etc. The data may also include dynamic data provided from external sources such as weather information, traffic information, etc. This data may relate to instances typically of interest to the vehicle driver and may indicate to the processor 122 that the information should be passed through to the driver. In addition to or in alternative to the connected vehicle system, the processor 110 may receive data from the network 106, other mobile devices, etc.

FIG. 2 illustrates an example block diagram of the vehicle audio system 100 of FIG. 1. The processor 122 may receive audio signals from the exterior microphones 118 and the interior microphones 118. The processor 122 may determine whether these signals should be passed through to one or more of the vehicle occupants. In one example, the processor 122 may determine whether an exterior audio signal includes an alert such as a siren. If so, then the processor 122 may pass this sound through to the driver's headset 116*a,* but not the headsets 116 of the other occupants. In another example, the processor 122 may determine that a private conversation is occurring between the driver and the front seat passenger. In this example, the voice signals acquired by the interior microphones 118 may be passed through to first and second headsets 116*a,* 116*b,* but not the remaining headsets 116*c,* 116*d.* In this example, the rear seat occupants may enjoy their respective media content, uninterrupted.

In yet another example, a parent occupant may select to listen and monitor a conversation between the child occupants. The parent may select, via the infotainment device 112 or HMI, to listen to respective occupants. In this example, sound signals acquired from the interior microphone 118 associate with that occupant may be passed through to the parent headset 116.

In the example where an occupant elects to listen to the interior audio picked up by the interior microphones 118, the occupant may make such selection at the infotainment device 112, or other device, such as his or her smartphone, tablet, etc. The selection may be made via a touchscreen on either the infotainment device 112, the vehicle display, or the occupant's personal device, In another example, the selection may be made audibly by giving a voice command. For example, the occupant may say "listen in on rear occupant conversation" or "initiate private conversation with the driver."

Figure 3:
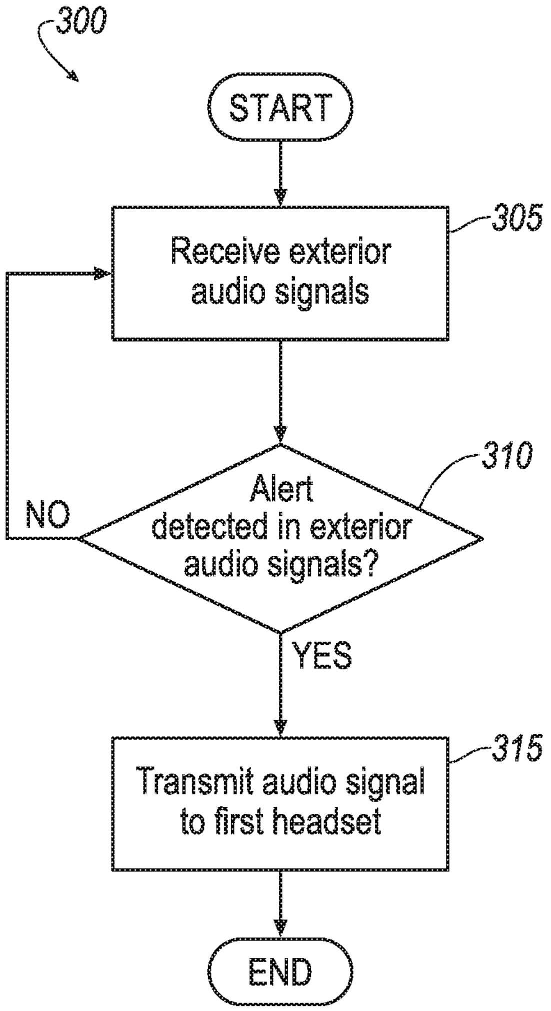
FIG. 3 illustrates an example process for the audio system where an exterior sound may interrupt the driver's current content.

FIG. 3 illustrates an example process 300 for the audio system 100 where an exterior sound may interrupt the driver's current content. The process 300 may begin at block 305 where the processor 122 receives exterior audio signals from the exterior microphones 120.

At block 310, the processor 122 may determine whether the exterior audio signals include an alert. The processor may determine this by analyzing the audio signals for certain alert-like sounds, such as sirens, announcements, etc. A sound may be classified as an alert signal in response to the processor 122 recognizing, the sound as that typically heard in an emergency situation. The processor 122 may be in communication with a database of known sounds whereby certain characteristics of the audio signal is compared with characteristics of known alert sounds. Additionally or alternatively, the processor 122 may include a self-learning and adaptive capability to learn certain sounds.

If the processor 122 determines that the exterior audio signals include an alert sound, the process proceeds to block 315. If not, the process 300 proceeds to block 305.

At block 315, the processor 122 may transmit the exterior audio signal to one of the headsets 116. In this example, the exterior audio signal may only be transmitted to the driver's headset, as it may be most pertinent to the driver to be aware of an oncoming emergency vehicle. The processor 122 may return the driver's headset 116*a* to its normal content once the alert sound is no longer recognized within the exterior audio signals. The process 300 may then end.

Figure 4:
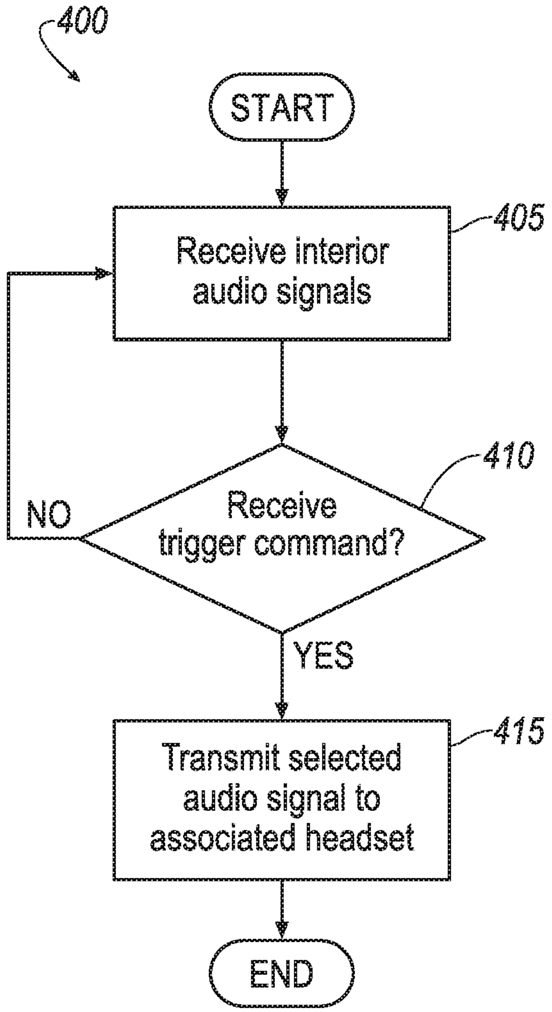
FIG. 4 illustrates an example process for the audio system where an interior sound may interrupt one of the occupant's current content.

FIG. 4 illustrates an example process 400 for the audio system 100 where an interior sound may interrupt one of the occupant's current content. The process 400 may begin at block 405 where the processor 122 receives interior audio signals from the interior microphones 118, At block 410, the processor 122 may determine whether a trigger command has been received from one of the occupants. The trigger command may include a touchscreen initiated command at the infotainment devices 112 or an audible command recognized by the interior microphones 118. Other forms of trigger commands may also he included, such as audible trigger commands such as trigger words, that when received by the interior microphones 118, may be recognized by the processor 122 as a trigger command. For example, a driver may state "enter conversation mode with front passenger." If a trigger command has been received, the process 400 proceeds to block 415. If not, the process 400 proceeds to block 405.

At block 415, the processor 122 may transmit the selected audio signal as indicated by the trigger command to the associated headset. That is, if a passenger wishes to have a conversation with the driver, then audio signals detected by the interior microphones 118 associated with the occupant and the driver may be transmitted to the other respective headset to permit conversation to be heard at each headset. The process 400 may then end.

Both process 300 and process 400 may occur simultaneously. The processor 122 may maintain a hierarchy of commands where in some examples, an exterior audio signal including an alert may preempt any commands made by the occupants regarding internal audio signals (e.g., a siren may be transmitted to the driver even if the driver had selected to have a conversation with an occupant.)

Computing devices described herein generally include computer-executable instructions, where the instructions may be executable by one or more computing or hardware devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An in-car headphone system, comprising:
- a plurality of first headsets, each associated with a vehicle occupant and configured to transmit audio signals to the associated occupant;
- at least one interior microphone configured to receive an interior audio signal from within a vehicle cabin;
- at least one exterior microphone configured to receive an exterior audio signal acquired from outside of the vehicle; and
- a processor programmed to:
  - receive at least one of the interior audio signal from the at least one interior microphone and the exterior audio signal from the at least one exterior microphone;
  - determine whether at least one of the interior audio signal and exterior audio signal include a trigger command-, wherein the trigger command indicates which of the plurality of headsets is to receive the trigger command; and
  - transmit the audio signal that includes the trigger command or alert signal to the first headset indicated by the trigger command in response to the audio signals including the trigger command.

2. The system of claim 1, wherein the trigger command includes an alert signal including an audible sound relating to an emergency.

3. The system of claim 2, wherein the alert signal includes an audible siren.

4. The system of claim 1, wherein the trigger command includes a command received via a human machine interface (HMI).

5. The system of claim 1, further comprising a second headset associated with a second occupant.

6. The system of claim 5, wherein the processor is programmed to transmit the interior audio signal to the first and second headsets.

7. The system of claim 1, wherein the trigger command is an audible command.

8. An in-car headphone system, comprising:

a plurality of headsets, each associated with a vehicle occupant and configured to transmit audio signals to the first vehicle occupant, wherein the plurality of headsets includes a first headset associated with a driver of a vehicle;

at least one exterior microphone configured to receive an exterior audio signal acquired from outside of the vehicle; and a processor programmed to:

receive the exterior audio signal from the at least one exterior microphone;

determine whether the exterior audio signal includes an alert signal; and transmit the exterior audio signal the first headset in response to the exterior audio signal including the alert signal.

9. The system of claim 8, wherein the alert signal includes an audible sound relating to an emergency.

10. The system of claim 8, wherein the alert signal includes an audible siren.

11. The system of claim 8, wherein the processor is further programed to receive a plurality of known alert sounds and compare the exterior audio signal with the known alert sounds to determine whether the exterior audio signal includes the alert signal.

12. The system of claim 8, further comprising at least one second headset associated with a second vehicle occupant distinct from the driver of the vehicle.

13. The system of claim 12, wherein the processor is further programed to transmit the exterior audio signal only to the first headset associated with the driver and not to the at least one second headset.

14. An in-car headphone method, comprising:

receiving an interior audio signal from at least one interior microphone;

receiving at least one trigger command including an identification of which of a subset of a plurality of headsets to transmit the interior audio signal to, each of the headsets being associated with a vehicle occupant; and transmitting the interior audio signal to the subset of headsets in response to the trigger command.

15. The method of claim 14, wherein the trigger command includes a command received via a human machine interface (HMI).

16. The method of claim 14, wherein the trigger command is an audible command.

17. The method of claim 14, wherein the interior audio signal includes human voice signals acquired by microphones associated with the occupants associated with the subset of headsets.

18. The method of claim 14, further comprising continuously transmitting media signals to the other headsets not included in the subset of headsets.

19. The method of claim 14, wherein the trigger command identifies a subset of occupants to receive the interior audio signal.

* * * * *